United States Patent
Ishikawa et al.

(10) Patent No.: US 10,434,840 B2
(45) Date of Patent: Oct. 8, 2019

(54) CONTROL SYSTEM FOR RADIANT HEATING DEVICE

(71) Applicant: DENSO CORPORATION, Kariya, Aichi-pref. (JP)

(72) Inventors: Kimitake Ishikawa, Kariya (JP); Hideaki Kako, Kariya (JP); Akira Oga, Kariya (JP); Hiroshi Takeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 358 days.

(21) Appl. No.: 15/116,860

(22) PCT Filed: Feb. 3, 2015

(86) PCT No.: PCT/JP2015/000463
§ 371 (c)(1),
(2) Date: Aug. 5, 2016

(87) PCT Pub. No.: WO2015/125423
PCT Pub. Date: Aug. 27, 2015

(65) Prior Publication Data
US 2017/0182868 A1    Jun. 29, 2017

(30) Foreign Application Priority Data
Feb. 18, 2014  (JP) .................... 2014-028870

(51) Int. Cl.
*B60H 1/22* (2006.01)
*B60R 21/01* (2006.01)
(Continued)

(52) U.S. Cl.
CPC .............. *B60H 1/22* (2013.01); *B60H 1/2218* (2013.01); *B60H 1/2227* (2019.05); *B60R 16/03* (2013.01);
(Continued)

(58) Field of Classification Search
CPC .............. B60H 1/22; B60H 2001/2231; B60H 2001/224; B60H 2001/2253;
(Continued)

(56) References Cited

U.S. PATENT DOCUMENTS

| | | | |
|---|---|---|---|
| 2002/0195290 A1* | 12/2002 | Hayakawa | B60K 28/14 180/277 |
| 2004/0237558 A1 | 12/2004 | Komatsu | |
| 2007/0240684 A1* | 10/2007 | Tippy | F02D 41/22 123/497 |
| 2009/0139781 A1* | 6/2009 | Straubel | B60L 11/1875 180/65.1 |

(Continued)

FOREIGN PATENT DOCUMENTS

| | | |
|---|---|---|
| CN | 102917893 A | 2/2013 |
| JP | 2004351985 A | 12/2004 |

(Continued)

*Primary Examiner* — Steven B McAllister
*Assistant Examiner* — John E Bargero
(74) *Attorney, Agent, or Firm* — Harness, Dickey & Pierce, P.L.C.

(57) ABSTRACT

A control system for a radiant heater device includes a radiant heater device, a heater ECU that controls an energization and a deenergization of a heat generation unit, and an integrated ECU that transmits an operation prohibition command for prohibiting the energization of the heat generation unit and an operation permission command for permitting the energization of the heat generation unit to the heater ECU. The integrated ECU transmits the operation prohibition command when receiving a collision signal indicative of a vehicle collision or a prediction of the vehicle collision, and transmits the operation permission command when not receiving the collision signal. The heater ECU performs the deenergization control when a non-reception state in which the operation permission command is not received from the integrated ECU is continued for a predetermined time or more. As a result, the energization can be interrupted before an occupant is adversely affected.

11 Claims, 5 Drawing Sheets

(51) Int. Cl.
  *B60R 16/03* (2006.01)
  *B60R 21/013* (2006.01)
(52) U.S. Cl.
  CPC ............ *B60R 21/01* (2013.01); *B60R 21/013*
    (2013.01); *B60H 2001/224* (2013.01); *B60H
    2001/2231* (2013.01); *B60H 2001/2253*
    (2013.01); *B60H 2001/2287* (2013.01); *B60R
    2021/01252* (2013.01); *B60R 2021/01286*
    (2013.01)
(58) Field of Classification Search
  CPC .......... B60H 2001/2287; B60R 21/013; B60R
    2021/01286; B60R 2021/01252
  USPC .......................................................... 237/5
  See application file for complete search history.

(56) References Cited

U.S. PATENT DOCUMENTS

| | | | |
|---|---|---|---|
| 2012/0061365 A1* | 3/2012 | Okamoto | B60H 1/2225 |
| | | | 219/202 |
| 2012/0243426 A1* | 9/2012 | Matsui | H04L 1/1887 |
| | | | 370/252 |
| 2013/0068440 A1 | 3/2013 | Kamiyama | |
| 2016/0046174 A1 | 2/2016 | Sagou et al. | |

FOREIGN PATENT DOCUMENTS

| | | |
|---|---|---|
| JP | 2012056531 A | 3/2012 |
| WO | WO-2011152187 A1 | 12/2011 |
| WO | WO-2014155940 A1 | 10/2014 |

* cited by examiner

CONTROL SYSTEM FOR RADIANT HEATING DEVICE

CROSS-REFERENCE TO RELATED APPLICATIONS

This application is a U.S. National Phase Application under 35 U.S.C. 371 of International Application No. PCT/JP2015/000463 filed on Feb. 3, 2015 and published in Japanese as WO 2015/125423 A1 on Aug. 27, 2015. This application is based on and claims the benefit of priority from Japanese Patent Application No. 2014-028870 filed on Feb. 18, 2014. The entire disclosures of all of the above applications are incorporated herein by reference.

TECHNICAL FIELD

The present disclosure relates to a control system for a radiant heater device for controlling the operation of the radiant heater device that heats an object by radiation.

BACKGROUND ART

Patent Literature 1 discloses one configuration of radiant heater devices known up to now. The radiant heater device is disposed to face an occupant and to be contactable by the occupant in a vehicle interior. In such a radiant heater device, when the occupant comes in contact with a heater body, if the contact is made for a predetermined time or longer, there is a concern the occupant may feel an uncomfortable heat or adversely affect the occupant's body.

Patent Literature 2 discloses a technique in which an electronic control unit that detects a collision of a vehicle and operates an airbag is provided, and a refrigerant is discharged from a refrigeration cycle to outside when the electronic control unit outputs a signal for operating the airbag.

PRIOR ART LITERATURE

Patent Literature

Patent Literature 1: JP 2012-56531 A
Patent Literature 2: JP 2004-351985 A

SUMMARY OF THE INVENTION

However, according to considerations by the present inventors of the present disclosure, when a collision of the vehicle occurs, a predetermined positional relationship between the radiant heater device and the occupant in Patent Literature 1 may be disturbed, and a contact between the occupant and the heater body may be unavoidable. In Patent Literature 2, there is a point to be noted regarding the communication of the actuation signal for the airbag.

For example, in Patent Literature 2, if a collision of the vehicle occurs, and a communication line for transmitting a signal for operating the airbag or a control device is damaged, or an energization of the control device is interrupted, then an energization interruption of the radiant heater device may not be appropriately performed. In addition, in order to interrupt the energization immediately after a collision, a communication device that can perform an extremely high-speed communication and which is stable is required. Therefore, there is a need for further improvements in the operation control of a radiant heater device.

The present disclosure has been made in view of the above points, and an object of the present disclosure is to provide a control system for a radiant heater device which is capable of interrupting an energization before an occupant is adversely affected.

One disclosure relates to a control system for a radiant heater device including a radiant heater device provided in a vehicle, the radiant heater device including a heat generation unit that generates heat due to energization, the radiant heater device emitting a radiant heat due to the heat supplied from the heat generation unit, a heater control device that controls an energization and a deenergization of the heat generation unit, and an operation command device that transmits, to the heater control device, an operation prohibition command that prohibits the energization of the heat generation unit when receiving a collision signal indicative of a collision of the vehicle or a prediction of the collision of the vehicle, and transmits, to the heater control device, an operation permission command that permits the energization of the heat generation unit when not receiving the collision signal, wherein the heater control device performs the deenergization control when a non-reception state is continued for a predetermined non-reception determination threshold or more, the non-reception state being a state in which the operation permission command is not received from the operation command device. The non-reception determination threshold is a threshold set for determining performing deenergization when the non-reception state continues for this value or longer.

According to the present disclosure, the operation command device can receive the collision signal such as a signal indicating that the vehicle has collided, or a signal indicating that the vehicle is likely to collide, from equipment mounted in the vehicle. The operation command device is configured to transmit the operation prohibition command to the heater control device in response to reception of the collision signal, and transmit the operation permission command in response to non-reception of the collision signal. An impact of a collision may cause a communication line, a power line, or a communication device to be damaged, or a power supply to be disabled. In such a situation, because no command is transmitted to the heater control device, even if an actual collision or a collision prediction occurs, the heater control device cannot perform the deenergization control.

In this case, the control system for a radiant heater device performs the deenergization when the non-reception state of the operation permission command is continued for the set non-reception determination threshold or more, and can surely perform the deenergization even if the heater control device cannot receive the operation permission command due to some problem. Therefore, it is possible to provide a control system for a radiant heater device in which even if a problem occurs in a variety of communications and a system of the power supply due to a collision, the energization can be interrupted before the occupant is adversely affected.

One disclosure relates to a control system for a radiant heater device, including a radiant heater device provided in a vehicle, the radiant heater device including a heat generation unit that generates heat due to energization, the radiant heater device emitting a radiant heat due to the heat supplied from the heat generation unit, and a heater control device that controls an energization and a deenergization of the heat generation unit, wherein the heater control device performs the deenergization control when receiving a collision signal indicative of a collision of the vehicle or a prediction of the collision of the vehicle, and performs the energization control when receiving a non-collision signal indicating that the collision signal is not received, and the heater control device performs the deenergization control when an unreceivable state is continued for a predetermined unreceivability determination threshold or more, the unreceivable state being a state in which neither of the collision signal and the non-collision signal can be received. The unreceivability determination threshold is a threshold set for determining performing deenergization when the unreceivable state continues for this value or longer.

According to the above configuration, the heater control device can receive the collision signal and a non-collision signal such as a signal indicating that the vehicle has collided, or a signal indicating that the vehicle is likely to collide, from an equipment mounted in the vehicle. The heater control device is configured to perform the deenergization control in response to the reception of the collision signal, and perform the energization control in response to the reception of the non-collision signal. However, the impact of a collision may cause the communication line, the power line, or the communication device to be damaged, or the power supply to be disabled. In such a situation, because the heater control device cannot receive those signals, even if an actual collision or a collision prediction occurs, the heater control device cannot perform the deenergization control.

In this case, the control system for a radiant heater device performs the deenergization when a state in which all of the signals are unreceivable is continued for the set unreceivability determination threshold or more. As a result, the control system for a radiant heater device can surely perform the deenergization even if the heater control device cannot receive the signals due to some problem. Therefore, it is possible to provide a control system for a radiant heater device in which even if a problem occurs in a variety of communications and a system of the power supply due to a collision, the energization can be interrupted before the occupant is adversely affected.

EMBODIMENTS FOR CARRYING OUT INVENTION

Hereinafter, multiple aspects for implementing the present disclosure will be described with reference to the drawings. In each aspect, the same reference numerals are assigned to portions corresponding to contents described in a preceding aspect, and repetitive description may be omitted. In each embodiment, when only a part of the configuration is described, another embodiment previously described can be employed for other parts of the configuration. When, in the respective embodiments, it is specifically described that certain parts can be used in combination, the parts can be used in combination. However, without being limited thereto, even when there is no description in relation to combination, parts of the embodiments can be used in combination as long as there is no problem in combination.

(First Embodiment)

Figure 1:
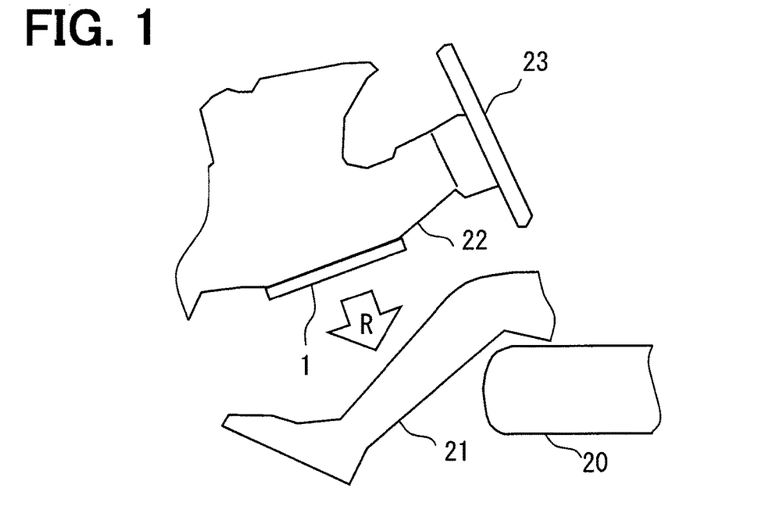
FIG. 1 is a diagram illustrating a positional relationship between a radiant heater device and an occupant according to respective embodiments of the present invention.

A radiant heater device 1 (hereinafter, also referred to as "device 1") according to a first embodiment is installed in an interior of a moving body such as road traveling vehicles, ships, or aircrafts, or an interior of buildings fixed to land. Referring to FIG. 1, the device 1 according to the first embodiment may form a part of a heating device for a vehicle interior. The device 1 is an electric heater that is powered by a power supply such as a battery mounted in the moving body or a power generator to generate heat. The device 1 is formed into a thin plate. The device 1 is powered to generate the heat. The device 1 radiates a radiant heat R mainly toward a direction perpendicular to the surface of the device 1 for the purpose of heating an object located in a direction perpendicular to the surface of the device 1.

A seat 20 in which an occupant 21 is to be seated is installed in the vehicle interior. The device 1 is installed in the interior to radiate the radiant heat R toward the feet of the occupant 21. The device 1 is installed on a wall surface of the interior. The wall surface of the interior is an interior part such as an instrument panel, a door trim, or a ceiling. The device 1 is installed to face the occupant 21 of an expected normal posture. For example, the road vehicle has a steering column 22 for supporting a steering wheel 23. The device 1 can be installed on a lower surface of the steering column 22 so as to face the occupant 21.

The device 1 is formed in a substantially rectangular thin plate shape. The device 1 includes a substrate part forming a heater main body, multiple heat generation units, and a pair of terminals which are conductive parts. The device 1 can be also called a surface heater that radiates the radiant heat R mainly toward a direction perpendicular to the surface.

The substrate part is made of a resin material that provides excellent electric insulation properties, and withstands high temperatures. The substrate part is a multilayer substrate. The substrate part includes a front surface layer, a rear surface layer, and an intermediate layer. The front surface layer faces a radiation direction of the radiant heat R. In other words, when the device 1 is installed, the front surface layer is arranged to face a portion of the occupant 21, i.e., the heating target. The rear surface layer forms a back surface of the device 1. The intermediate layer supports the heat generation unit and the terminals. The substrate part is a member for supporting the multiple heat generation units, each of which is linear. The front surface layer, the rear surface layer, and the intermediate layer are insulating parts made of a material lower in thermal conductivity than the heat generation unit and the terminals. For example, the front surface layer, the rear surface layer, and the intermediate layer may be made of polyimide resin.

Each of the multiple heat generation units is made of a material that is energized to generate heat. The heat generation unit can be made of metal material. For example, the heat generation unit can be made of copper, silver, tin, stainless steel, nickel, or nichrome. Each of the multiple heat generation units is formed into a linear shape or a plate shape parallel to the surface of the substrate part 10, and is dispersed over the surface of the substrate part. The multiple heat generation units are disposed to be interposed between the front surface layer and the rear surface layer together with the intermediate layer. The multiple heat generation units are protected from outside by the substrate part.

The respective heat generation units are members that are thermally connected to at least the front surface layer and are energized to generate heat. With the above configuration, the heat generated by the heat generation unit is transmitted to the front surface layer. The heat generated by one of the heat generation units is radiated from the front surface layer toward outward as a radiant heat through a member such as the substrate part, and the generated heat is supplied to the opposing occupant 21. Each of the heat generation units is set to have a predetermined resistance. Each of the heat generation units has a dimension and a shape set so that a thermal resistance in a lateral direction has a predetermined value. With the above configuration, the multiple heat generation units generate the predetermined amount of heat generation with the application of a predetermined voltage. The multiple heat generation units generate the predetermined amount of heat generation, and rise to a predetermined temperature. The multiple heat generation units that have risen to the predetermined temperature heat the front surface layer to a predetermined radiation temperature. The device 1 can radiate a radiant heat R that allows the occupant 21, i.e., a person, to feel warm.

The output, the temperature, and the amount of heat generation of the heat generation unit are controlled by a heater ECU 3. The heater ECU 3 controls the energization and deenergization of the heat generation unit, and controls a voltage value and a current value to be applied to the heat generation unit, to thereby control the output, the temperature, and the amount of heat generation of the heat generation unit. Therefore, the heater ECU 3 can change the amount of radiant heat to be provided to the occupant 21. When the energization of the device 1 is started by means of the heater ECU 3, a surface temperature of the device 1 rapidly rises up to the predetermined radiation temperature to be controlled. This makes it possible to rapidly provide warmth to the occupant 21 even in winter.

When an object (for example, the occupant) comes in contact with the front surface layer of the device 1, the heat transmitted from the heat generation unit to the front surface layer is rapidly transmitted to the contacting object. This results in a rapid reduction in the temperature of the contacting portion of the front surface layer. Hence, the surface temperature of the device 1 on the portion contacting the object is rapidly reduced. The heat of the portion contacting the object is transmitted to the contacting object, and diffused into the contacting object. For that reason, an excess rise of the surface temperature of the contacting object is suppressed.

For example, when the vehicle collides with another vehicle or object, a predetermined positional relationship between the device 1 and the occupant is disturbed, and the occupant may come in contact with the heat generation unit. Such contact is unexpected for the occupant, and the occupant may not be able to move depending on the degree of the collision, and the occupant may not be able to separate from the heat generation unit. If such a condition persists, the occupant is likely to feel uncomfortable, and the occupant's body may be adversely affected. Therefore, the control system for the radiant heater device according to the first embodiment is made to solve such a problem.

Figure 2:
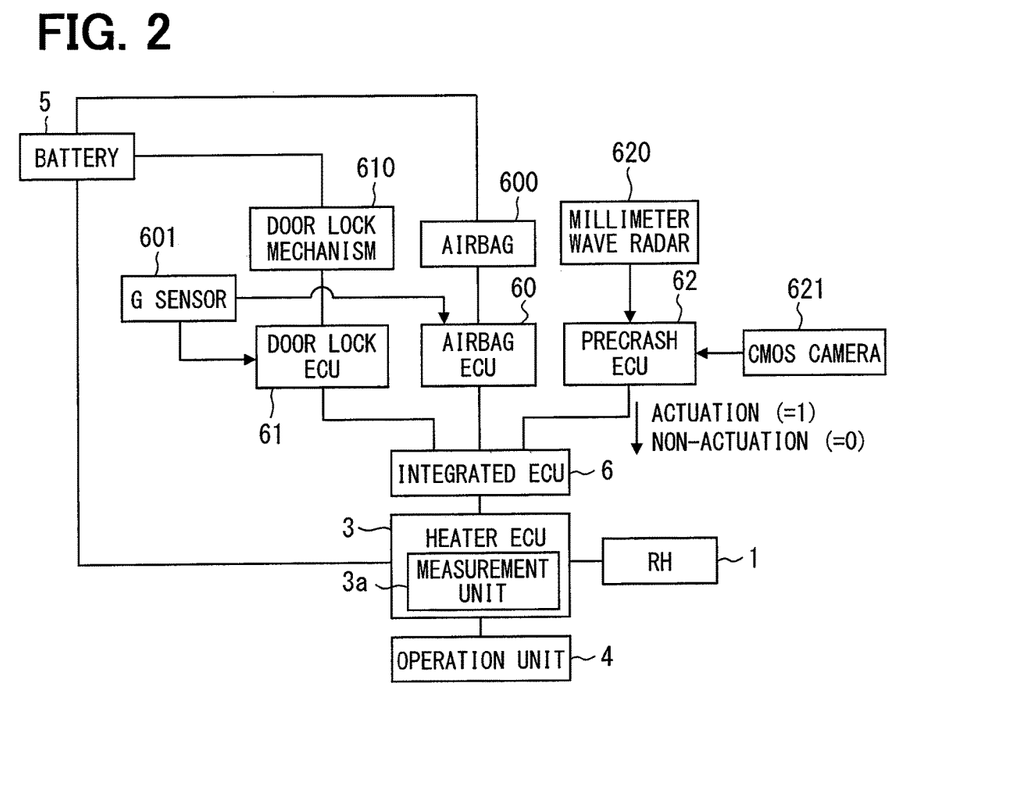
FIG. 2 is a block diagram illustrating a control system for a radiant heater device according to a first embodiment and a second embodiment.

As illustrated in FIG. 2, the control system for the radiant heater device includes at least the device 1, the heater ECU 3, an integrated ECU 6, a battery 5, and various ECUs that transmit the collision signals related to the collision or a collision prediction to the integrated ECU 6.

The battery 5 may be, for example, a battery assembly formed of a stack of multiple battery cells. Each of the battery cells can be formed of, for example, a nickel-hydrogen secondary battery, a lithium ion secondary battery, or an organic radical battery. In the example illustrated in FIG. 2, the battery 5 supplies an electric power for operation to the heater ECU 3, a door lock mechanism 610, and an airbag 600. The battery 5 may be configured to supply electric power for operation to other ECUs such as the integrated ECU 6, an airbag ECU 60, a door lock ECU 61, and a precrash ECU 62 in addition to the heater ECU 3. The battery 5 is connected to the various devices to which the electric power is supplied by power wires, and the electric power for the operation is supplied to those devices through the power wires. In addition, the battery 5 may be, for example, chargeable and dischargeable, and can be intended for supplying the electric power to a vehicle travel motor.

The heater ECU 3 is a heater control device for controlling the operation of the device 1. The heater ECU 3 can control an output level of the heat generation unit. The output level can be set to predetermined multiple steps or steplessly. The output level of the heat generation unit may be determined by arithmetic operation using a predetermined program in an automatic operation, or may be determined according to a command signal transmitted by the occupant operating an operation unit 4.

The heater ECU 3 can supply the electric power obtained from the battery 5 to the device 1, and control the supply power. The heater ECU 3 can control the output of the heat generation unit under the power control. The heater ECU 3 is configured to perform arithmetic processing and control processing with the supply of a DC power from the battery 5 which is a vehicle power supply mounted in the vehicle, regardless of the on/off state of an ignition switch that controls start and stop of an engine. The heater ECU 3 is configured to receive various switch signals from the operation unit 4 on an operation panel which is installed integrally with the instrument panel.

The operation unit 4 having various switches includes an operation switch and a level setting switch which are operable by the occupant. The operation switch is a driving operation unit having on/off buttons operated by the occupant for the purpose of driving and stopping the device 1. When the on/off buttons of the operation switch are operated by the occupant, a command for driving or stopping the device 1 is output to the heater ECU 3. Upon turning on the operation switch, the heater ECU 3 executes the operation control of the radiant heater device 1 according to the reception or non-reception of the collision signal. The level setting switch sets the output level of the heat generation unit by operating a level up switch and a level down switch by the occupant, and the heater ECU 3 controls the output level from the heat generation unit according to the set output level.

The heater ECU 3 is provided with a microcomputer including functions of a CPU (central processing unit) that performs arithmetic processing and control processing, a memory such as a ROM or a RAM, and an I/O port (input/output circuit). Various signals from various sensors and the integrated ECU 6 are subjected to A/D conversion by, for example, the I/O port or an A/D conversion circuit, and thereafter input to the microcomputer. The memory such as the ROM or the RAM forms the storage unit of the heater ECU 3. The storage unit is pre-stored with predetermined control characteristic data. The various sensors include an inside air temperature sensor, an outside air temperature sensor, an IR sensor, and a heater temperature sensor.

The integrated ECU 6 is an operation command device that transmits an operation prohibition command and an operation permission command of the device 1 to the heater ECU 3. The integrated ECU 6 transmits a signal of an operation prohibition command for prohibiting the energization of the heat generation unit to the heater ECU 3 when receiving a collision signal indicative of a collision of the vehicle or a prediction of a collision, and transmits a signal of an operation permission command for permitting the energization to the heater ECU 3 when not receiving these collision signals.

The integrated ECU 6 may include, for example, various ECUs related to an engine control, a control of a driving system, a control of a braking system, and a control of a steering system in the vehicle, a vehicle ECU, and an air conditioning ECU for controlling an air conditioning apparatus. The air conditioning ECU is a control device for controlling the air conditioning of the vehicle interior. The air conditioning ECU outputs control signals to, for example, actuators for respective mode doors, a motor driver circuit of a blower motor, a capacity control valve of a compressor, and a clutch driver circuit of an electromagnetic clutch, and controls various air conditioning function components. Therefore, the heater ECU 3 is able to operate the device 1 in conjunction with the air conditioning operation performed by the air conditioning ECU.

The various collision-related ECUs that operate at the time of the collision or the collision prediction transmit predetermined signals to the integrated ECU 6. The collision-related ECUs that transmit the actuation signals related to the collision as described above include, for example, electronic control devices of the airbag ECU 60, the door lock ECU 61, and the precrash ECU 62. The integrated ECU 6 can communicate with the airbag ECU 60, the door lock ECU 61, and the precrash ECU 62, and recognizes that the vehicle has collided, or is likely to collide, based on the collision signals output from those ECUs.

A G sensor 601 is disposed, for example, on a vehicle body frame of a vehicle front end. When the G sensor 601 detects an acceleration of a specified value or more upon the collision of the vehicle front end with, for example, a preceding vehicle or an obstacle, the G sensor 601 outputs a collision detection signal to the airbag ECU 60 and the door lock ECU 61. The airbag 600 is disposed on the driver's seat front part fitted to the steering or the like, and disposed in a passenger's seat side dashboard.

When receiving a collision detection signal from the G sensor 601, the airbag ECU 60 outputs a predetermined actuation signal "1" corresponding to the collision of the vehicle to the integrated ECU 6. Upon receiving the actuation signal "1", the integrated ECU 6 transmits an operation prohibition signal to the heater ECU 3. When the device 1 is in an automatic operation state or the operation switch is on, the heater ECU 3 deenergizes the heat generation unit in the device 1 according to the operation prohibition signal, and the device 1 is not operated.

When not receiving the collision detection signal from the G sensor 601, the airbag ECU 60 outputs a predetermined non-actuation signal "0" corresponding to non-reception of the collision detection signal to the integrated ECU 6 at predetermined intervals, that is, periodically. Upon receiving the non-actuation signal "0", the integrated ECU 6 transmits the operation permission signal to the heater ECU 3. When the device 1 is in the automatic operation state or the operation switch is on, the heater ECU 3 implements the energization of the heat generation unit in the device 1 according to the operation permission signal, and the device 1 is operated.

The airbag ECU 60 ignites an inflator, for example, 10 ms after the collision detection signal is input, and injects gas into an airbag 600 to deploy the airbag 600. The airbag 600 discharges the gas, for example, 10 ms after the deployment has been completed, and deflates the airbag 600. The driver is restrained by the airbag 600 with the deployment of the airbag 600, and released from the airbag 600 with the deflation of the deployed airbag 600.

When receiving the collision detection signal from the G sensor 601, the door lock ECU 61 outputs the predetermined actuation signal "1" corresponding to the collision of the vehicle to the integrated ECU 6. Upon receiving the actuation signal "1", the integrated ECU 6 transmits an operation prohibition signal to the heater ECU 3. When the device 1 is in an automatic operation state or the operation switch is on, the heater ECU 3 deenergizes the heat generation unit in the device 1 according to the operation prohibition signal, and the device 1 is not operated.

When receiving no collision detection signal from the G sensor 601, the door lock ECU 61 outputs the predetermined non-actuation signal "0" corresponding to the non-reception of the collision detection signal to the integrated ECU 6 at predetermined intervals, that is, periodically. Upon receiving the non-actuation signal "0", the integrated ECU 6 transmits the operation permission signal to the heater ECU 3. When the device 1 is in the automatic operation state or the operation switch is on, the heater ECU 3 implements the energization of the heat generation unit in the device 1 according to the operation permission signal, and the device 1 is operated. In addition, the door lock ECU 61 releases a locked state of the door lock mechanism 610 of the vehicle as soon as the door lock ECU 61 receives the collision detection signal.

The precrash ECU 62 analyzes a radar signal from a millimeter wave radar 620 and a video signal from a CMOS camera 621 to determine whether the vehicle is likely to collide, or not. Upon detecting that the vehicle is likely to collide, the precrash ECU 62 outputs the precrash signal, that is, the collision signal indicative of the collision prediction to the integrated ECU 6. When the precrash ECU 62 receives the radar signal and the video signal described above to determine that the collision is predicted, the precrash ECU 62 outputs an actuation signal "1" corresponding to that the collision is likely to occur to the integrated ECU 6. Upon receiving the actuation signal "1", the integrated ECU 6 transmits an operation prohibition signal to the heater ECU 3. When the device 1 is in the automatic operation state or the operation switch is on, the heater ECU 3 deenergizes the heat generation unit in the device 1 according to the operation prohibition signal, and the device 1 is not operated.

When not receiving the radar signal and the video signal, or when determining that no collision is predicted, the precrash ECU 62 outputs a non-actuation signal "0" corresponding to the non-reception of the collision detection signal to the integrated ECU 6 at predetermined intervals. Upon receiving the non-actuation signal "0", the integrated ECU 6 transmits the operation permission signal to the heater ECU 3. When the device 1 is in the automatic operation state or the operation switch is on, the heater ECU 3 implements the energization of the heat generation unit in the device 1 according to the operation permission signal, and the device 1 is operated.

Subsequently, a flow of processing in the control of energization and deenergization related to the reception and non-reception of the collision signal will be described with reference to a flowchart of FIG. 3.

Figure 3:
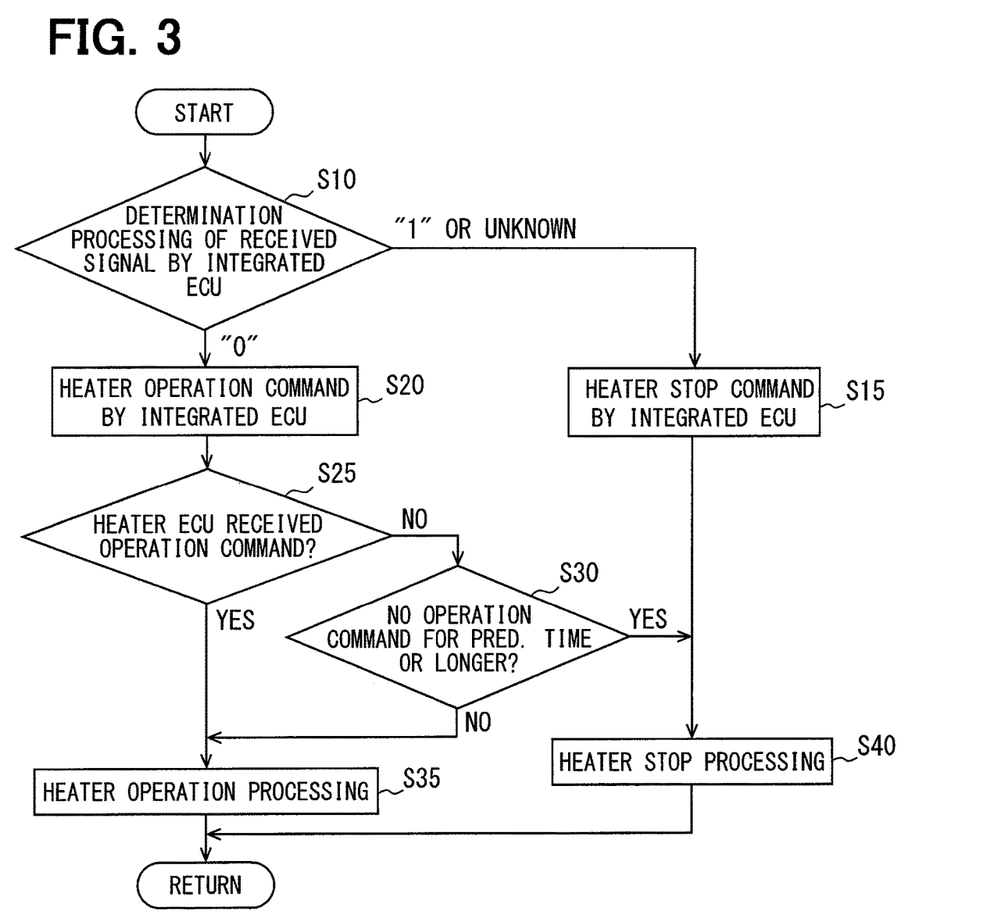
FIG. 3 is a flowchart illustrating a control of energization and deenergization according to the first embodiment.

The flowchart illustrated in FIG. 3 starts when the device 1 enters the automatic operation state or the operation switch turns on. When the automatic operation state is released, or when the operation switch turns off, the flowchart illustrated in FIG. 3 is forcedly terminated.

First, in Step S10, the integrated ECU 6 executes a process of determining a received result related to the collision signal. In other words, the integrated ECU 6 determines the process to be executed next according to a case in which the received result is a signal corresponds to the actuation signal "1", a case in which the received result is the non-actuation signal "0", and a case in which the received signal is none of those signals and is unknown.

When the determination result in Step S10 is the actuation signal "1" or unknown, the integrated ECU 6 proceeds to Step 15, and executes a process of transmitting a heat stop command, that is, the operation prohibition command to the heater ECU 3. The heater ECU 3 executes heater stop processing, that is, the control of deenergization of the heat generation unit in Step 40, and again returns to Step 10.

As described above, when the integrated ECU 6 receives none of the actuation signal "1" and the non-actuation signal "0", or when the integrated ECU 6 cannot receive any signals, it is assumed that an impact of the collision caused communication lines, power lines, or a communication device to be damaged, or interrupted a power supply from the battery 5. Therefore, in order to cope with an abnormal situation in which the collision signal cannot be transmitted to the integrated ECU 6 due to the occurrence of some problem even though the collision actually occurred, the integrated ECU 6 transmits the operation prohibition command to the heater ECU 3 in Step 15.

On the other hand, when the determination result in Step 10 is the non-actuation signal "0", the integrated ECU 6 proceeds to Step 20, and executes a process of transmitting a heater operation command, that is, the operation permission command to the heater ECU 3. For example, the integrated ECU 6 may transmit the operation permission command to the heater ECU 3 once or more per minute.

Then, the heater ECU 3 executes a process of determining whether the operation permission command has been received from the integrated ECU 6, or not, in Step 25. The processing in Step 25 is executed, for example, every one minute. With the frequent execution of the determination processing, a reception state of the heater ECU 3 can be confirmed. When it is determined that the heater ECU 3 has actually received the operation permission command in Step 25, the heater ECU 3 executes heater operation processing, that is, the control of the energization of the heat generation unit in Step 35, and again returns to Step 10.

On the other hand, when the heater ECU 3 determines that the operation permission command is not actually received in Step 25, it is assumed that the operation permission command that should be transmitted from the integrated ECU 6 has not reached the heater ECU 3 for some reason. In that case, in Step 30, the heater ECU 3 determines whether a time during which the operation permission command cannot be received has continued for a predetermined time or more, or not. More specifically, the heater ECU 3 includes a measurement unit 3a for measuring a duration time of a state in which the operation permission command cannot be received (a state of non-reception). The heater ECU 3 determines whether the measurement time of the measurement unit 3a is equal to or more than the predetermined time, or not.

The predetermined time is a predetermined non-reception determination threshold, and is set to, for example, several minutes (for example, the predetermined time may be between two minutes and ten minutes). The predetermined time is set to a time at which the deenergization can be achieved before the occupant feels uncomfortable or the body of the occupant is adversely affected when the occupant is held in continuous contact with the heat generation unit when the heat generation unit is operating normally. When the time during which the operation permission command cannot be received has continued for the non-reception determination threshold or more, it is recognized that an abnormal situation in which the heater ECU 3 cannot receive the signal has occurred due to the occurrence of some problem. The heater ECU 3 executes the control of the deenergization of the heat generation unit in Step 40, and again returns to Step 10.

When it is determined that the time during which the operation permission command cannot be received has not reached the non-reception determination threshold in Step 30, it is assumed that the heater ECU 3 could not yet receive the signal due to a deviation between a transmission timing from the integrated ECU 6 and a determination processing timing in Step 25. In that case, the process proceeds to Step 35, the control of the energization of the heat generation unit is executed, and the process again returns to Step 10. When the non-reception state in which the heater ECU 3 cannot receive the operation permission command is still continued, the process proceeds to Steps 10, 20, and 25 in the stated order, and the determination processing in Step 30 is again repeated. When the time of the non-reception state continuously reaches the non-reception determination threshold or more while the determination processing in Step 30 is repeated, the process proceeds to Step 40, and the control of the deenergization of the heat generation unit is executed.

Figure 4A:
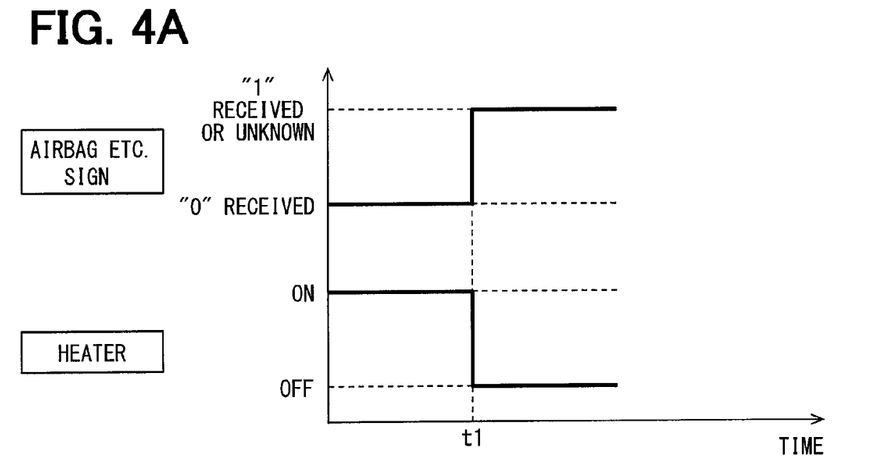
FIG. 4A is a time chart illustrating the control of energization and deenergization in relationship with an airbag signal or the like in the radiant heater device according to the first embodiment.
Figure 4B:
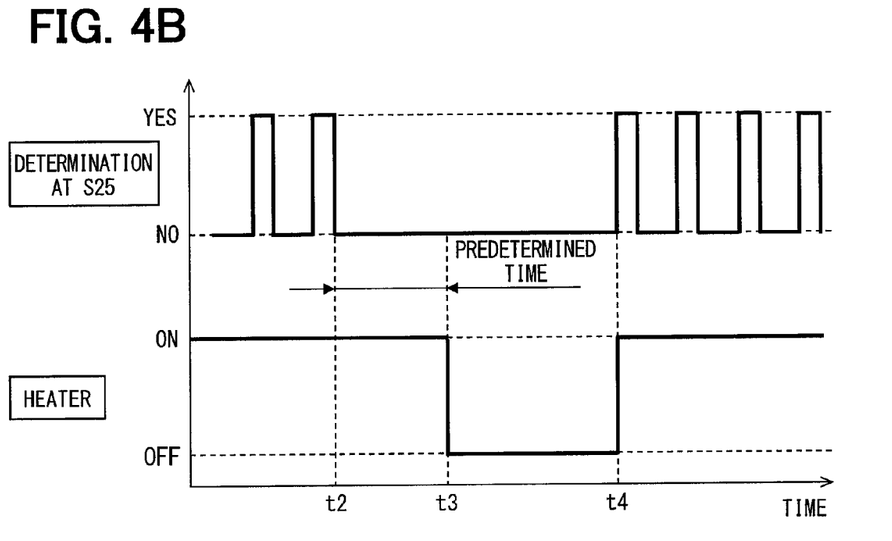
FIG. 4B is a time chart illustrating the control of energization and deenergization in relationship with a determination of S25, in the radiant heater device according to the first embodiment.

An example of a relationship between each step and the operation described above is illustrated in the time charts of FIGS. 4A and 4B. Referring to FIG. 4A, upon receiving a non-actuation signal "0" indicative of the non-reception of the collision detection signal from the airbag ECU 60 or the like, the integrated ECU 6 implements the energization of the device 1 (heat generation unit) (heater: on). At a time t1, while the predetermined actuation signal "1" (collision signal) corresponding to the collision of the vehicle is transmitted from the airbag ECU 60 or the like, when the integrated ECU 6 receives the actuation signal "1" or receives nothing as "unknown", the device 1 is not energized (heater: off). As illustrated in FIG. 4B, when it is determined that the operation permission signal is received in Step 25 while the collision signal is not transmitted, the control of the energization of the heat generation unit is executed (continued) (heater: on). At a time t2, with the occurrence of some problem, non-reception of the operation permission signal is determined in Step 25 (determination of S25: no), and at a time t3 where the time reaches the non-reception determination threshold (predetermined time), the control of the deenergization of the heat generation unit is executed (heater: off). For example, when the problem is eliminated, and it is determined that the operation permission signal is again received in Step 25, then the energization of the heat generation unit is restored at a time t4.

Next, the operation effects of the control system in the radiant heater device 1 according to the first embodiment will be described. According to the first embodiment, the integrated ECU 6 transmits the operation prohibition command for prohibiting the energization of the heat generation unit to the heater ECU 3 when receiving the collision signal, and transmits the operation permission command for permitting the energization of the heat generation unit to the heater ECU 3 when not receiving the collision signal. When the state of non-reception in which the operation permission command is not received from the integrated ECU 6, which is the operation command device, continues for the predetermined non-reception determination threshold (predetermined time) or more, the heater ECU 3 performs the control of deenergization (Steps 30, 40).

According to the above control system, the integrated ECU 6 can receive the collision signal from equipment mounted in the vehicle. The integrated ECU 6 is configured to transmit the operation prohibition command to the heater ECU 3 in response to the reception of the collision signal, and transmit the operation permission command in response to the non-reception of the collision signal. An impact or the like of a collision may cause the communication lines, the power lines, or the communication device to be damaged, or the power supply to be disabled. In such a situation, because no command is transmitted to the heater ECU 3, even if a collision or a collision prediction actually occurs, the heater ECU 3 cannot perform the control of deenergization. Hence, the occupant may be adversely affected.

Under the circumstances, the control system according to the first embodiment performs the deenergization when the non-reception state of the integrated ECU 6 is continued for the set non-reception determination threshold or more, and can surely perform the deenergization even if the heater ECU 3 cannot receive the operation permission command due to some problem. Therefore, according to the above control, it is possible to provide a control system in which even if a problem occurs in the various communications and the system of the power supply due to a collision, the energization can be surely interrupted before the occupant is adversely affected.

When receiving a non-collision signal indicating that the collision signal is not received, the integrated ECU 6 transmits the operation permission command to the heater ECU 3. When the integrated ECU 6 is in an unreceivable state where the integrated ECU 6 cannot receive any of the collision signal and the non-collision signal, the integrated ECU 6 transmits the operation prohibition command to the heater ECU 3 (Steps 10 and 15). According to the above control, the occurrence of a situation in which the integrated ECU 6 cannot receive the collision signal due to the occurrence of some problem, or a situation in which the collision signal cannot be transmitted to the integrated ECU 6 from the airbag ECU 60, can be surely detected.

The heater ECU 3 performs the control of deenergization when the state of non-reception is continued for a predetermined time or more (Steps 30 and 40), and performs the control of energization when the state of non-reception is continued for less than the predetermined time (Steps 30 and 35). According to the above control, the occurrence of an abnormal situation in which the heater ECU 3 cannot receive the collision signal due to the occurrence of some problem can be surely detected.

The radiant heater device 1 exhibits the following effects. When the inside air temperature (ambient temperature) is low, the occupant 21 hardly feels warmth. Therefore, according to the radiant heater device 1, with an increase in the output of the heat generation unit, the heating feeling can be raised even if the occupant feels cold in the interior. In addition, according to the radiant heater device 1, when the inside air temperature (ambient temperature) is low, a skin temperature of the occupant 21 is low. Therefore, with an increase in the temperature of the heat generation unit, the surface temperature of the heater decreases when a human body contacts with the heater, and therefore the occupant 21 hardly feels hot.

When the inside air temperature (ambient temperature) is high, the occupant 21 is likely to feel warmth. Therefore, according to the radiant heater device 1, with a decrease in the output of the heat generation unit, the occupant 21 obtains the heating feeling even if the surface temperature of the heater is low. In addition, according to the radiant heater device 1, when the inside air temperature (ambient temperature) is high, the skin temperature of the occupant 21 also increases. Therefore, with a decrease in the heat generation unit, the surface temperature of the heater decreases when the human body contacts with the heater, and therefore the occupant 21 hardly feels hot.

(Second Embodiment)

Figure 5:
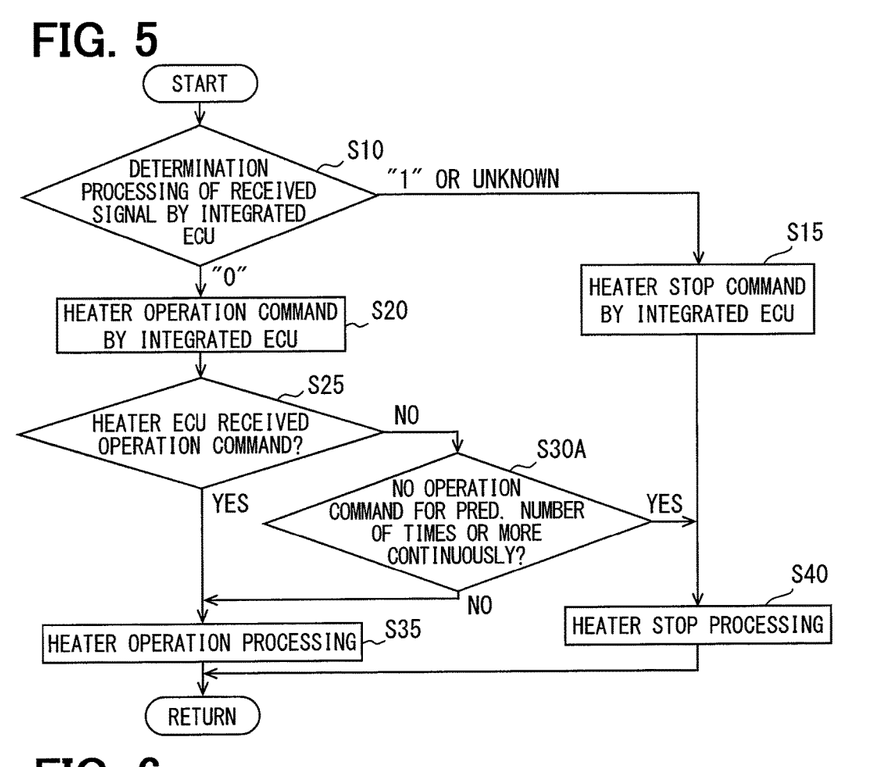
FIG. 5 is a flowchart illustrating a control of energization and deenergization according to the second embodiment.

A second embodiment is another configuration of the control described in the first embodiment with reference to FIG. 3. The second embodiment is executed according to a flowchart illustrated in FIG. 5. The flowchart in FIG. 5 is different from the flowchart of FIG. 3 in only Step 30A, and identical in other steps. In the second embodiment, steps denoted by the same symbols as those in the drawings associated with the first embodiment are identical with those in the first embodiment, and exhibit the same effects. Hereinafter, only portions different from those in the first embodiment will be described.

When it is determined that the heater ECU 3 did not actually receive the operation permission command in Step 25, the heater ECU 3 determines whether the number of determinations in which the heater ECU 3 cannot receive the operation permission command is continued for a predetermined number of times or more, or not, in Step 30A. More specifically, the heater ECU 3 includes a detection unit for detecting whether the heater ECU 3 is in a state where the operation permission command cannot be received (state of non-reception), or not, at predetermined intervals (for example, every one minute). In other words, the heater ECU 3 according to the second embodiment includes the detection unit instead of the measurement unit 3a in the first embodiment. The heater ECU 3 determines whether the detection unit detects the state of non-reception continuously for a predetermined number of times or more, or not.

The predetermined number of times is a predetermined non-reception determination threshold, and is set to, for example, several times (for example, a predetermined number of times between twice and ten times). The predetermined number of times is set to the continuous number of determinations in Step 25 in which the deenergization can be achieved before the occupant feels uncomfortable or the body of the occupant is adversely affected when the occupant is held in a continuous contact with the heat generation unit that is in an energization state. When the number of times where the operation permission command cannot be received is continued for the non-reception determination threshold or more, it is recognized that an abnormal situation in which the heater ECU 3 cannot receive the signal has occurred due to the occurrence of some problem. The heater ECU 3 executes the control of the deenergization of the heat generation unit in Step 40, and again returns to Step 10.

When it is determined that the number of times in which the operation permission command cannot be received has not reached the non-reception determination threshold in Step 30A, it is assumed that the heater ECU 3 could not yet receive the signal due to a deviation between a transmission timing from the integrated ECU 6 and a determination processing timing in Step 25. In that case, the process proceeds to Step 35, the control of the energization of the heat generation unit is executed, and the process again returns to Step 10. When the non-reception state in which the heater ECU 3 cannot receive the operation permission command is still continued, the process proceeds to Steps 10, 20, and 25 in the stated order, and the determination processing in Step 30A is again repeated. When the number of the determinations of the non-reception state continuously reaches the non-reception determination threshold or more while the determination processing in Step 30A is repeated, the process proceeds to Step 40, and the control of the deenergization of the heat generation unit is executed.

According to the second embodiment, the heater ECU 3 performs the control of deenergization when the detection unit detects (determines) the non-reception state continuously a predetermined number of times or more (Steps 30A, 40). When the detection unit detects (the number of determinations) the non-reception continuously less than the predetermined number of times, the heater ECU 3 performs the control of energization (Steps 30A and 35). According to the above control, the occurrence of an abnormal situation in which the heater ECU 3 cannot receive the collision signal due to the occurrence of some problem can be surely detected. Therefore, it is possible to provide a control system for the radiant heater device 1 which prevents the occupant from being adversely affected due to the occurrence of unforeseen circumstances in advance.

(Third Embodiment)

Figure 6:
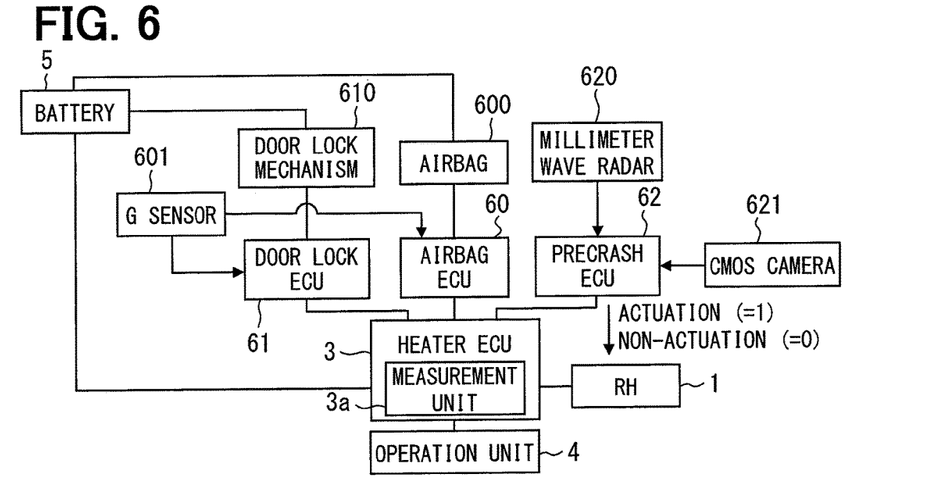
FIG. 6 is a block diagram illustrating a control system for a radiant heater device according to a third embodiment and a fourth embodiment.

A third embodiment is another configuration of the control system described in the first embodiment with reference to FIG. 2. The control system according to the second embodiment has a configuration illustrated in FIG. 6. Further, a control in the second embodiment is executed according to a flowchart illustrated in FIG. 7. The control system illustrated in FIG. 6 is different from the control system of FIG. 2 in that a heater ECU 3 can receive a collision signal and a non-collision signal without passing through the integrated ECU 6. In the third embodiment, components and steps denoted by the same symbols as those in the drawings associated with the first embodiment are identical with those in the first embodiment, and the same advantages are obtained. Hereinafter, only portions different from those in the first embodiment will be described.

An airbag ECU 60, a door lock ECU 61, and a precrash ECU 62, which are examples of a collision-related ECU can communicate with a heater ECU 3. The heater ECU 3 recognizes that a vehicle has collided or is likely to collide according to collision signals output from those ECUs.

When receiving a collision detection signal from a G sensor 601, the airbag ECU 60 outputs a predetermined actuation signal "1" corresponding to the collision of the vehicle to the heater ECU 3. When a device 1 is in an automatic operation state or an operation switch is on, the heater ECU 3 deenergizes a heat generation unit in the device 1 upon receiving the actuation signal "1", and the device 1 does not operate.

When receiving no collision detection signal from the G sensor 601, the airbag ECU 60 outputs a predetermined non-actuation signal "0" corresponding to non-reception of the collision detection signal to the heater ECU 3 at predetermined intervals. When the device 1 is in the automatic operation state or operation switch is on, the heater ECU 3 energizes the heat generation unit in the device 1 upon receiving a non-actuation signal "0", and the device 1 operates.

When receiving the collision detection signal from the G sensor 601, the door lock ECU 61 outputs a predetermined actuation signal "1" corresponding to the collision of the vehicle to the heater ECU 3. When a device 1 is in an automatic operation state or an operation switch is on, the heater ECU 3 deenergizes a heat generation unit in the device 1 upon receiving the actuation signal "1", and the device 1 does not operate.

When receiving no collision detection signal from the G sensor 601, the door lock ECU 61 outputs a predetermined non-actuation signal "0" corresponding to the non-reception of the collision detection signal to the heater ECU 3 at predetermined intervals. When the device 1 is in the automatic operation state or the operation switch is on, the heater ECU 3 energizes the heat generation unit in the device 1 upon receiving a non-actuation signal "0", and the device 1 operates.

When the precrash ECU 62 receives the radar signal and the video signal described above to determine that the collision is predicted, the precrash ECU 62 outputs an actuation signal "1" corresponding to that the collision is likely to occur to the heater ECU 3. When the device 1 is in the automatic operation state or the operation switch is on, the heater ECU 3 deenergizes the heat generation unit in the device 1 upon receiving the actuation signal "1", and the device 1 operates.

When not receiving the radar signal and the video signal, or when determining that no collision is predicted, the precrash ECU 62 outputs a non-actuation signal "0" corresponding to the non-reception of the collision detection signal to the heater ECU 3 at predetermined intervals. When the device 1 is in the automatic operation state or the operation switch is on, the heater ECU 3 energizes the heat generation unit in the device 1 upon receiving a non-actuation signal "0", and the device 1 operates.

Subsequently, a flow of processing in the control of energization and deenergization related to the reception, non-reception and unknown of the collision signal will be described with reference to a flowchart of FIG. 7.

Figure 7:
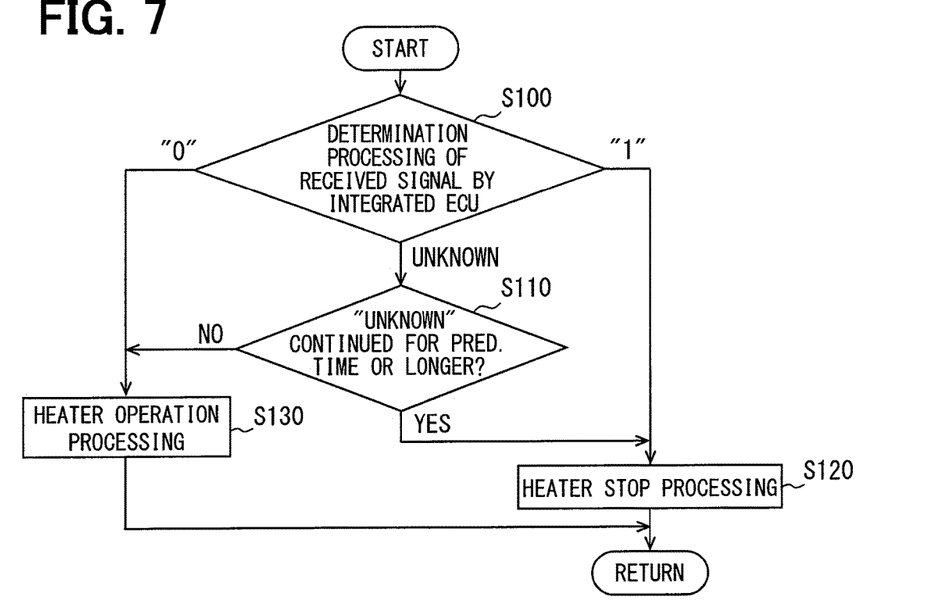
FIG. 7 is a flowchart illustrating a control of energization and deenergization according to the third embodiment.

The flowchart illustrated in FIG. 7 starts when the device 1 is in an automatic operation state or the operation switch turns on. When the automatic operation state is released, or the operation switch turns off, the flowchart illustrated in FIG. 7 is forcedly terminated.

First, in Step S100, the heater ECU 3 executes a process of determining a received result related to the collision signal. In other words, the heater ECU 3 determines the process to be executed next according to a case in which the received result is a signal corresponding to the actuation signal "1", a case in which the received result is the non-actuation signal "0", and a case in which the received signal is none of those signals, i.e., is unknown.

When a determination result in Step 100 is the actuation signal "1", the heater ECU 3 proceeds to Step 120, executes heater stop processing, that is, the control of deenergization of the heat generation unit, and again returns to Step 100.

When a determination result in Step 100 is the non-actuation signal "0", the heater ECU 3 proceeds to Step 130, executes heater operation processing, that is, the control of energization of the heat generation unit, and again returns to Step 100. A process of transmitting a heat operation command, that is, an operation permission command to the heater ECU 3 is executed.

When the determination result in Step S100 is indicative of receiving neither of the actuation signal "1" and the non-actuation signal "0", or when the determination result is indicative of not receiving any signals, it is assumed that an impact of the collision causes communication lines, power lines, and a communication device to be damaged, or a power supply to be interrupted. Therefore, in order to cope with an abnormal situation in which the collision signal cannot be transmitted to the heater ECU 3 due to the occurrence of some problem regardless whether a collision actually occurred, the heater ECU 3 executes the determination processing in Step 110. The heater ECU 3 determines whether a time during which the signal is unknown or unreceivable is continued for a predetermined time or more, or not, in Step 110. In other words, the heater ECU 3 determines whether a duration time of a state in which the signal is unreceivable, which is measured by the measurement unit 3a, is equal to or more than a predetermined time, or not.

The predetermined time is a predetermined unreceivability determination threshold, and is set to, for example, several minutes (for example, the predetermined time may be between two minutes and ten minutes). The predetermined time is set to a time at which the deenergization can be achieved before the occupant feels uncomfortable or the body of the occupant is adversely affected when the occupant is held in continuous contact with the heat generation unit during normal operation. When the unreceivable time is continued for the unreceivability determination threshold or more, it is recognized that an abnormal situation in which the heater ECU 3 cannot receive the signal occurs due to the occurrence of some problem. The heater ECU 3 executes the control of the deenergization of the heat generation unit in Step 120, and again returns to Step 100.

When it is determined that the unreceivable time has not reached the unreceivability determination threshold in Step 110, it is assumed that the heater ECU 3 could not yet receive the signal due to a deviation between a receiving timing of the heater ECU 3 and a determination processing timing in Step 100. In that case, the process proceeds to Step 130, the control of the energization of the heat generation unit is executed, and the process again returns to Step 100. When the state in which the heater ECU 3 cannot receive the signal is still continued, "unknown" is determined in Step 100, and the determination processing in Step 110 is again repeated. When the time of the unreceivable state continuously reaches the unreceivability determination threshold or more while the determination processing in Step 110 is repeated, the process proceeds to Step 120, and the control of the deenergization of the heat generation unit is executed.

According to the third embodiment, the heater ECU 3 performs the control of deenergization when receiving the collision signal indicating that the vehicle has collided or a collision of the vehicle is predicted, and performs the control of energization when receiving the non-collision signal indicating that the collision signal is not received. When the heater ECU 3 can receive neither of the collision signal and the non-collision signal, if the unreceivable state is continued for a predetermined unreceivability determination threshold or more, the heater ECU 3 performs the control of deenergization (Steps 110 and 120).

According to the above control system, the heater ECU 3 can receive the collision signal and the non-collision signal from the equipment mounted in the vehicle. The heater ECU 3 is configured to perform the deenergization control in response to the reception of the collision signal, and perform the energization control in response to the reception of the non-collision signal. However, it is assumed that an impact of the collision may cause the communication lines or the communication device to be damaged, or the power lines to be cut off to disable the power supply. In such a situation, because the heater ECU 3 cannot receive the respective signals, even if an actual collision or a collision prediction occurs, the heater ECU 3 cannot perform the control of deenergization. Hence, the occupant may be adversely affected.

Under the circumstances, the control system according to the third embodiment performs the deenergization when a state in which all signals are unreceivable is continued for the set unreceivability determination threshold or more. As a result, the control system can surely perform the deenergization even if the heater ECU 3 cannot receive the signals due to some problem. Therefore, according to the above control, it is possible to provide a system in which even if a problem occurs in the various communications and the system of the power supply due to the collision, the energization can be surely interrupted before the occupant is adversely affected.

(Fourth Embodiment)

Figure 8:
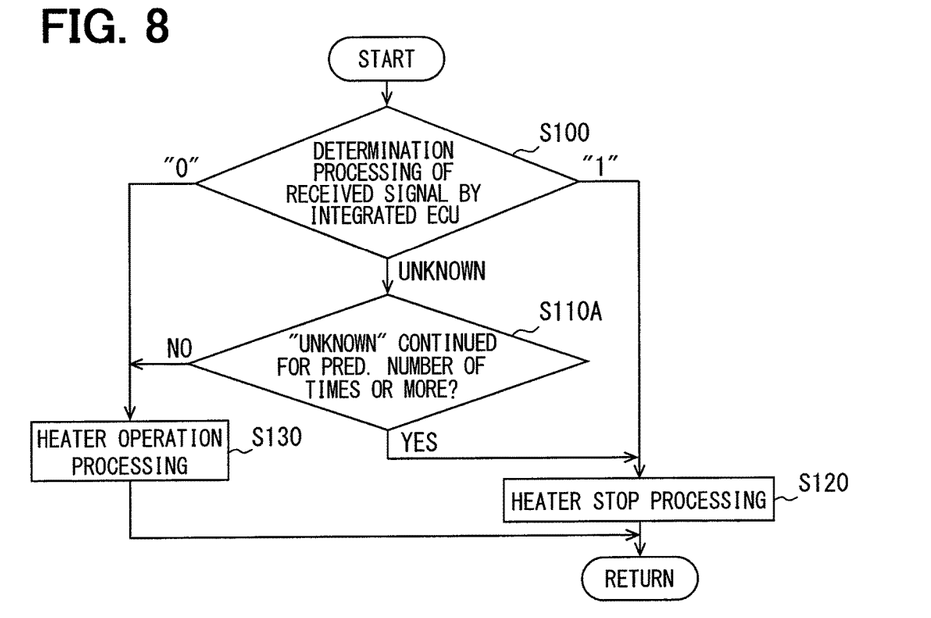
FIG. 8 is a flowchart illustrating a control of energization and deenergization according to the fourth embodiment.

A fourth embodiment is another configuration of the control described in the third embodiment with reference to FIG. 7. The fourth embodiment is executed according to a flowchart illustrated in FIG. 8. The flowchart in FIG. 8 is different from the flowchart of FIG. 7 in only Step 110A, and identical in other steps. In the fourth embodiment, steps denoted by the same symbols as those in the drawings associated with the third embodiment are identical with those in the third embodiment, and obtain the same advantages. Hereinafter, only portions different from those in the first embodiment will be described.

When the heater ECU 3 is determined as unknown or unreceivable in Step 100, the heater ECU 3 then determines whether the number of times (the number of determinations) to be determined as unknown or unreceivable is continued for a predetermined number of times or more, or not, in Step 110A. In other words, the heater ECU 3 includes a detection unit for detecting whether the unreceivable state is present, or not, at predetermined intervals, and determines whether the number of times in which the detection unit continuously detects the unreceivable state is equal to or more than a predetermined number of times.

The predetermined number of times is a predetermined unreceivability determination threshold, and is set to, for example, several times (for example, a predetermined number of times between twice and ten times). The predetermined number of times is set to the continuous number of determinations in Step 100 in which the deenergization can be achieved before the occupant feels uncomfortable or the body of the occupant is adversely affected when the occupant is held in continuous contact with the heat generation unit in an energization state. When the number of times to be determined as unknown or unreceivable is continued for the unreceivability determination threshold or more, it is recognized that an abnormal situation in which the heater ECU 3 cannot receive the signal occurs due to the occurrence of some problem. The heater ECU 3 executes the control of the deenergization of the heat generation unit in Step 120, and again returns to Step 100.

When it is determined that the number of times to be determined as unknown or unreceivable has not reached the non-reception determination threshold in Step 110A, it is assumed that the heater ECU 3 could not yet receive the signal due to a timing deviation between a transmission from the heater ECU 3 and determination processing in Step 100. In that case, the process proceeds to Step 130, the control of the energization of the heat generation unit is executed, and the process again returns to Step 100. When the state in which the heater ECU 3 cannot receive the signal is still continued, "unknown" is determined in Step 100, and the determination processing in Step 110A is again repeated. When the time of the unreceivable state continuously reaches the unreceivability determination threshold or more while the determination processing in Step 110A is repeated, the process proceeds to Step 120, and the control of the deenergization of the heat generation unit is executed.

According to the fourth embodiment, the heater ECU 3 performs the control of deenergization when the unreceivable state is detected (determined) continuously a predetermined number of times or more (Steps 110A, 120). The heater ECU 3 performs the control of energization when the number of detections (the number of determinations) is continued less than the predetermined number of times (Steps 110A, 130). According to the above control, the occurrence of an abnormal situation in which the heater ECU 3 cannot receive the collision signal due to the occurrence of some problem can be surely detected. Therefore, it is possible to provide a control system for the radiant heater device 1 which prevents the occupant from being adversely affected due to the occurrence of unforeseen circumstances in advance.

(Other Embodiments)

The preferred embodiments disclosed in the present disclosure have been described above. However, the present disclosure is not limited to the above-mentioned embodiments, but can be variously modified. The structures of the above embodiments are merely exemplary, and the disclosed technical scopes are not limited to the disclosed scopes. The disclosed technical scope is represented by the claims, and includes meanings equivalent to those of the claims, and all changes in the scope.

In the above respective embodiments, the ECU that transmits the collision signal to the integrated ECU may include a seat belt ECU that locks a seat belt of the vehicle.

In the first embodiment, the heater ECU 3 may be configured as a common control device integrated with the air conditioning ECU.

The invention claimed is:

1. A control system for a radiant heater device, comprising:
a radiant heater device provided in a vehicle, the radiant heater device including a heat generation unit that generates heat due to energization, the radiant heater device emitting a radiant heat due to the heat supplied from the heat generation unit;
a heater control device that controls an energization and a deenergization of the heat generation unit; and
an operation command device that transmits, to the heater control device, an operation prohibition command that prohibits the energization of the heat generation unit when receiving a collision signal indicative of a collision of the vehicle or a prediction of the collision of the vehicle, and transmits, to the heater control device, an operation permission command that permits the energization of the heat generation unit when not receiving the collision signal, wherein
the heater control device performs the deenergization control when a non-reception state is continued for a predetermined non-reception determination threshold or more, the non-reception state being a state in which the operation permission command is not received from the operation command device;
the operation command device periodically transmits, to the heater control device, the operation permission command that permits the energization of the heat generation unit when not receiving the collision signal;
the heater control device is configured to deenergize the heat generation unit when the operation prohibition command is received from the operation command device; and
when the operation permission command is not received from the operation command device, the heater control device is configured to: (i) measure a time period since receiving the operation permission command; (ii) compare the measured time period with a predetermined time period; (iii) energize the heat generation unit when the measured time period is less than the predetermined time period; and (iv) deenergize the heat generation unit when the measured time period is greater than the predetermined time period.

2. The control system for a radiant heater device according to claim 1, wherein
the operation command device transmits the operation permission command to the heater control device when receiving a non-collision signal indicating that the collision signal is not received, and
the operation command device transmits the operation prohibition command to the heater control device in an unreceivable state where neither of the collision signal and the non-collision signal can be received.

3. The control system for a radiant heater device according to claim 1, wherein
the heater control device performs the deenergization control when the non-reception state is continued for a predetermined time or more, and performs the energization control when the non-reception state is continued for less than the predetermined time.

4. The control system for a radiant heater device according to claim 1, wherein
the heater control device performs the deenergization control when the non-reception state is detected continuously a predetermined number of times or more, and performs the energization control when the non-reception state is detected continuously less than the predetermined number of times.

5. The control system for a radiant heater device according to claim 4, wherein
the heater control device includes a detection unit that detects whether the non-reception state exists or not at predetermined intervals, and
the heater control device performs the deenergization control when the detection unit detects the non-reception state continuously the predetermined number of times or more, and performs the energization control when the detection unit detects the non-reception state continuously less than the predetermined number of times.

6. A control system for a radiant heater device, comprising:
- a radiant heater device provided in a vehicle, the radiant heater device including a heat generation unit that generates heat due to energization, the radiant heater device emitting a radiant heat due to the heat supplied from the heat generation unit; and
- a heater control device that controls an energization and a deenergization of the heat generation unit, wherein the heater control device
- performs the deenergization control when receiving a collision signal indicative of a collision of the vehicle or a prediction of the collision of the vehicle, and
- performs the energization control when receiving a non-collision signal indicating that the collision signal is not received, and the heater control device performs the deenergization control when an unreceivable state is continued for a predetermined unreceivability determination threshold or more, the unreceivable state being a state in which neither of the collision signal and the non-collision signal can be received;

the heater control device is configured to deenergize the heat generation unit when the collision signal is received; and when the collision signal is not received, the heater control device is configured to: (i) measure a time period since receiving the non-collision signal; (ii) compare the measured time period with a predetermined time period; (iii) energize the heat generation unit when the measured time period is less than the predetermined time period; and (iv) deenergize the heat generation unit when the measured time period is greater than the predetermined time period.

7. The control system for a radiant heater device according to claim 6, wherein
the heater control device performs the deenergization control when the unreceivable state is continued for a predetermined time or more, and performs the energization control when the unreceivable state is continued for less than the predetermined time.

8. The control system for a radiant heater device according to claim 6, wherein
the heater control device performs the deenergization control when the unreceivable state is detected continuously a predetermined number of times or more, and performs the energization control when the unreceivable state is detected continuously less than the predetermined number of times.

9. The control system for a radiant heater device according to claim 8, wherein
the heater control device includes a detection unit that detects whether the unreceivable state is present, or not, in a predetermined cycle, and
the heater control device performs the deenergization control when the detection unit detects the unreceivable state continuously the predetermined number of times or more, and performs the energization control when the detection unit detects the unreceivable state continuously less than the predetermined number of times.

10. The control system for a radiant heater device according to claim 1, wherein the heater control device is configured to control the deenergization of the heat generation unit without stopping energization of any other device in the vehicle.

11. The control system for a radiant heater device according to claim 6, wherein the heater control device is configured to control the deenergization of the heat generation unit without stopping energization of any other device in the vehicle.

* * * * *